United States Patent

[11] 3,582,906

[72] Inventors William F. Beausoleil;
Paul J. Brown, both of Poughkeepsie, N.Y.

[21] Appl. No. 838,052
[22] Filed June 27, 1969
[45] Patented June 1, 1971

[73] Assignee International Business Machines Corporation
Armonk, N.Y.

[54] HIGH-SPEED DC INTERLOCKED COMMUNICATION SYSTEM INTERFACE
15 Claims, 5 Drawing Figs.

[52] U.S. Cl. .......... 340/172.5
[51] Int. Cl. .......... G06f 15/16
[50] Field of Search .......... 340/172.5; 235/157

[56] References Cited

UNITED STATES PATENTS 3,251,040 5/1966 Burkholder et al. .......... 340/172.5
3,336,582 8/1967 Beausoleil et al. .......... 340/172.5

*Primary Examiner*—Gareth D. Shaw
*Attorneys*—Hanifin and Jancin and Owen L. Lamb

ABSTRACT: A communication system which connects input/output (I/O) devices of different data rates with a data processing system. Transfer of the first byte of data to the data processing system from an I/O device is synchronized with the rise of an inbound tag from the I/O device. Receipt of the first byte by the data processing system is signalled by raising the outbound tag, following which the device drops the inbound tag. Transfer of the second byte from the I/O device is synchronized with the rise of a data in tag. Receipt of the second byte is signalled by raising the data out tag. The outbound tag is dropped after the inbound tag has dropped. The data out tag is dropped after the data in tag has dropped.

Transfer of data *to* the device *from* the data processing system utilizes the same sequence, however, transfer of the first byte is synchronized with the rise of the outbound tag and transfer of the second byte is synchronized with the rise of data out.

INVENTORS
WILLIAM F. BEAUSOLEIL
PAUL J. BROWN

BY Owen Lamb

ATTORNEY

HIGH-SPEED DC INTERLOCKED COMMUNICATION SYSTEM INTERFACE

BACKGROUND OF THE INVENTION

1. Field of the Invention

The invention relates to data communication systems and more particularly to an input/output interface interconnecting a data processing system with input/output units.

2. Description of the Prior Art

U. S. Pat. No. 3,336,582—Interlocked Communication System —Beausoleil et al., filed Sept. 1, 1964 and issued Aug. 15, 1967, discloses and I/O interface which is DC interlocked. The I/O interface provides a data information format and a control signal sequence definition which is common to all control units attachable to the system. The rise and fall of all signals transmitted over the interface are controlled by interlocked responses. Interlocking is necessary so that the interface operation is independent of the speed of the control units attached to the interface. This permits the connection of control units of different speeds to a single channel of the data processing system.

After performing an initial selection sequence which logically attaches an addressed input/output device to the channel, the control unit indicates that it is ready for data transfer from the channel to the I/O device by energizing an inbound tag to the channel. The channel then places digital data on an output bus, "bus out." The presence of the data is signalled to the I/O device by raising an outbound tag. The I/O device receives the information on bus out and deenergizes the inbound tag which signals the channel that the data has been accepted. In response to the fall of the inbound tag, the channel can then drop the outbound tag and prepare to put further digital data on bus out.

The data transfer rate on a DC interlocked interface of this type is limited to the speed of the circuits and the length of cable (transmission time to propagate signals) connecting the channel with the control unit. The data transfer signalled by the outbound tag cannot be again signalled until the tag sequence is completed and the in tag is again raised. The problem presented is how to obtain an increase in the data rate and still maintain full DC interlocking. DC interlocking is a necessary requirement for maintaining reliable data transmission on an interface which must permit the attachment of devices which operate at different data rates.

One simple way of increasing this data rate is by extending the number of buses, i.e., doubling the size of bus out and bus in. This is expensive as it would require substantial changes to both the channels and the control units in addition to an increase in the number of cables and connectors.

SUMMARY OF THE INVENTION

It is a paramount object of this invention to increase the data rate over a DC interlocked interface while maintaining a DC interlocking capability.

It is a further object of this invention to provide an improved DC interlocked interface whereby data, instructions and addressing occur at high speed over the same information bus.

Briefly, the above objects are accomplished in accordance with the invention by synchronizing data transfers to both the rise and fall of tag signals. In a preferred embodiment, this is accomplished by providing an additional set of control lines: *data in* and *data out*. Data is transferred from a second terminal (I/O device) over bus in to a first terminal (channel) by placing the first byte of data on bus in and raising the inbound tag. The first terminal responds by raising the outbound tag. A second byte of data is transmitted over bus in immediately following the first byte of data by placing the second byte on bus in and raising data in immediately after the outbound tag rises. (The rise of the outbound tag indicates that the first data byte has been accepted and the bus is now available.) The first terminal responds to the second byte of data by raising data out. Thus, the operation of the control lines data out and data in is overlapped with the operation of the outbound and inbound tags such that the data rate is effectively doubled while still maintaining complete interlocking of the interface operation.

The invention has the advantage that in addition to achieving higher data rates, the invention may alternatively permit control units to be placed at a greater distance from the channel than was previously possible.

The invention has the further advantage that current I/O devices and control units which are not equipped to handle data in and data out lines can still be attached to the interface without any change in performance or design.

The invention has the further advantage that additional functional capability is provided because a second address, command, or status byte can be transmitted over the data bus by utilizing the new data in and data out lines.

The foregoing and other objects, features and advantages of the invention will be apparent from the following more particular description of a preferred embodiment of the invention, as illustrated in the accompanying drawings.

In the drawings: FIG. 1 is a block diagram of a communication system in which the present system is embodied.

GENERAL

Figure 1:
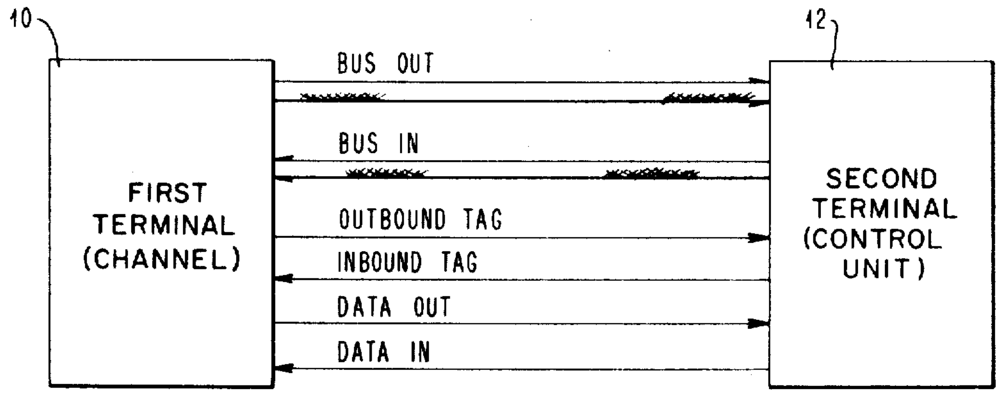

Referring to FIG. 1, the input/output interface of the above identified Beausoleil et al. patent is shown in a simplified form, including the additional data out and data in lines. Briefly, the interface comprises a bus out, which is used to transmit information (write data, I/O device address, commands, and control orders) from the first terminal (channel) 10 to the second terminal (control unit) 12. The bus in is used to transmit information (read data, selected I/O device identification, status information, and sense data) from the control unit to the channel. The outbound tag and the inbound tag represent the various tags which are used for interlocking and controlling information on the buses, and for special sequences. Additional lines not represented in this diagram include the selection controls which are used for the scanning of, or the selection of, attached I/O devices.

Figure 2:
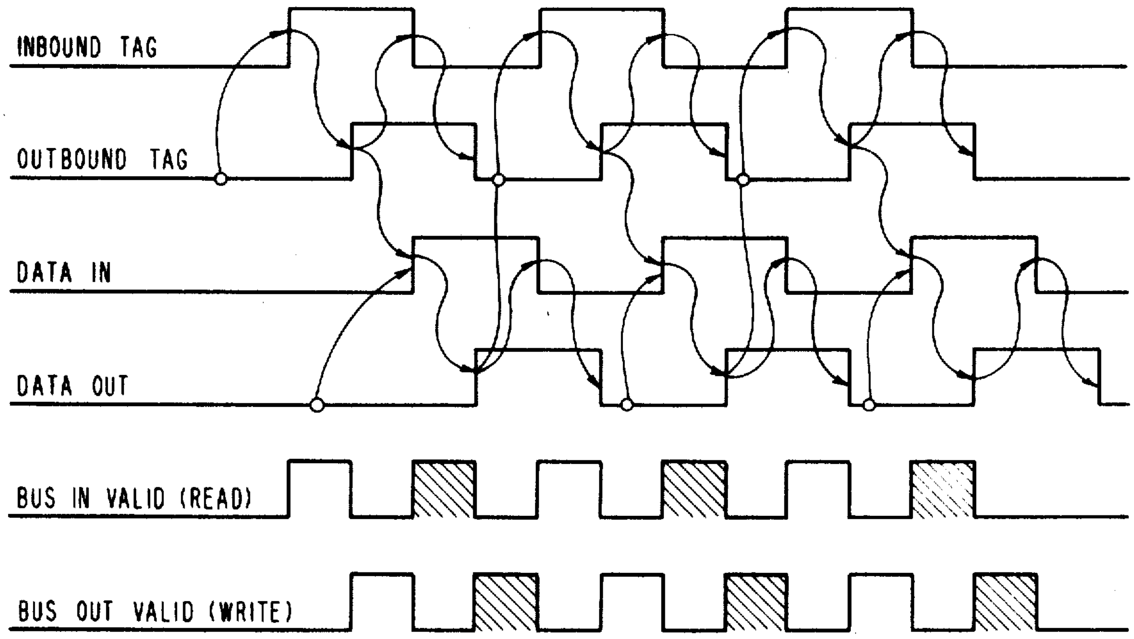
FIG. 2 is a timing diagram illustrating the operation of the system of FIG. 1.

Referring to the timing diagram of FIG. 2, the control unit 12 raises an inbound tag (e.g., service in) after it has been selected by the channel 10 in accordance with an initial selection sequence (described in the above identified Beausoleil et al. patent). The rise of service in starts either a write and/or a read data transfer. Write data are transferred from the channel to the control unit over bus out, in response to the inbound tag, by first placing the data on bus out and then raising an outbound tag (e.g., service out) which signals the control unit that bus out is valid. The control unit recognizes the outbound tag, accepts the data on bus out and signals the channel by lowering the inbound tag. The channel is then free to drop the outbound tag. Thus, full DC interlocking of the data transfer has been achieved.

Since bus out is free for the next byte of data as soon as the inbound tag is lowered, (even though the outbound tag is not free) a second byte of data (shown shaded in FIG. 2) can be requested immediately following the fall of the inbound tag by raising data in. The channel then responds to data in by placing the second byte of write data on bus out and raising the data out line. The control unit accepts the second byte of data and lowers the data in tag. The channel is then free to drop its data out tag. Thus, two bytes of data have been transferred by overlapping the interlocked controls controlling the transfer of write data on bus out. Read data is transferred over bus in in a similar manner.

The above general description can be applied to the transfer of data, I/O device address, commands, control orders, selected I/O device identification, status information and sense data by utilizing the appropriate tags described in the above identified Beausoleil et al. patent. For example, if address data are to be transferred over the buses, the appropriate tags utilized would be address in and address out. If a command is to be transferred over the buses, then the command out tag would be utilized in response to signals on the address in line during the initial selection sequence. Likewise, if status information is to be transferred then the status in tag line would be utilized in conjunction with service out or command out. If data are to be transferred over the buses, then the appropriate tags would be service in and service out. With all of the above operations which are more fully described in the Beausoleil et al. patent, a double transfer on the bus in or bus out is accomplished by utilizing the data in and data out lines in conjunction with the appropriate tag lines for effecting the transfer.

Figure 3:
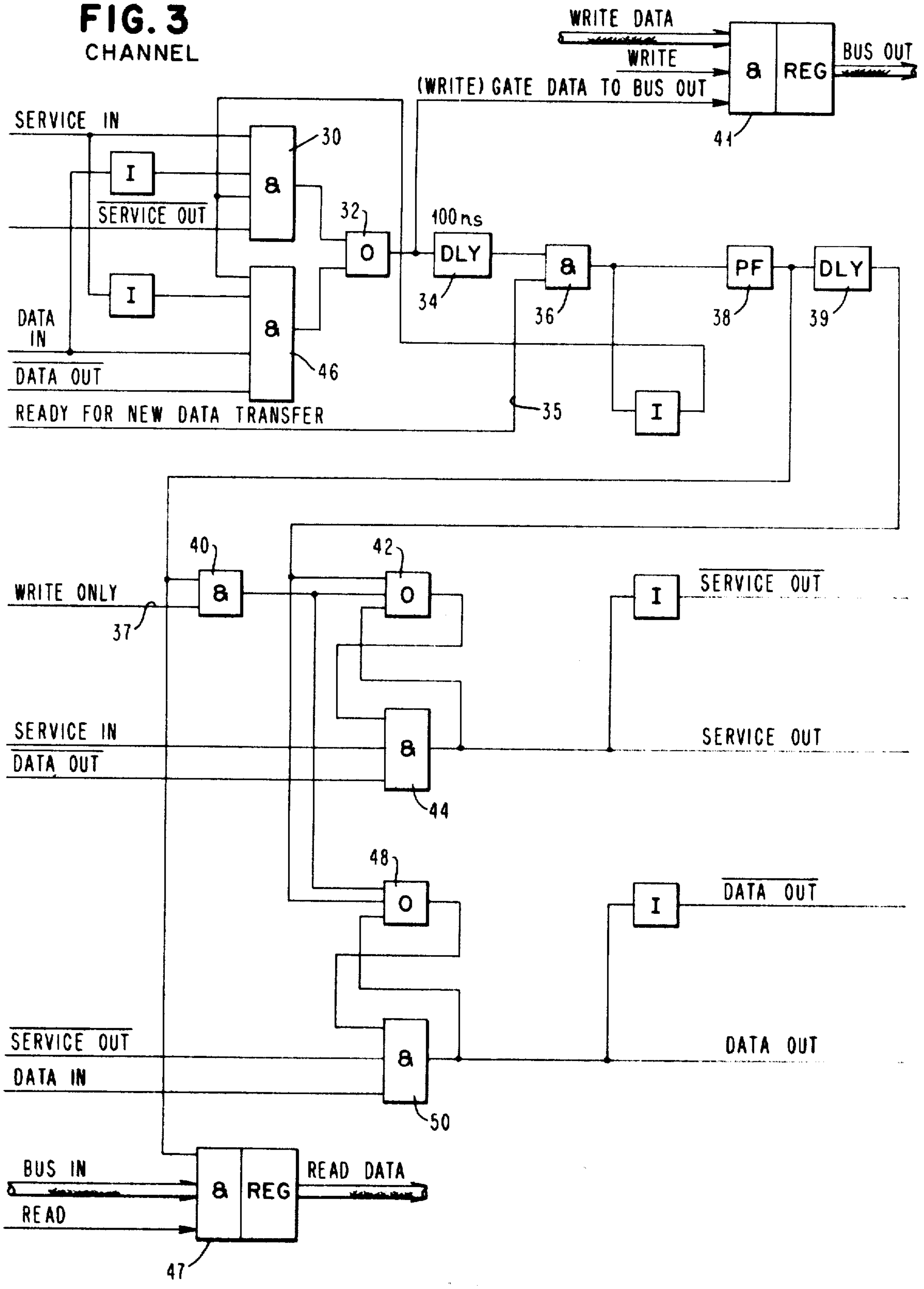
FIGS. 3 and 4 are more detailed block diagrams of the circuitry for implementing the invention.
Figure 4:
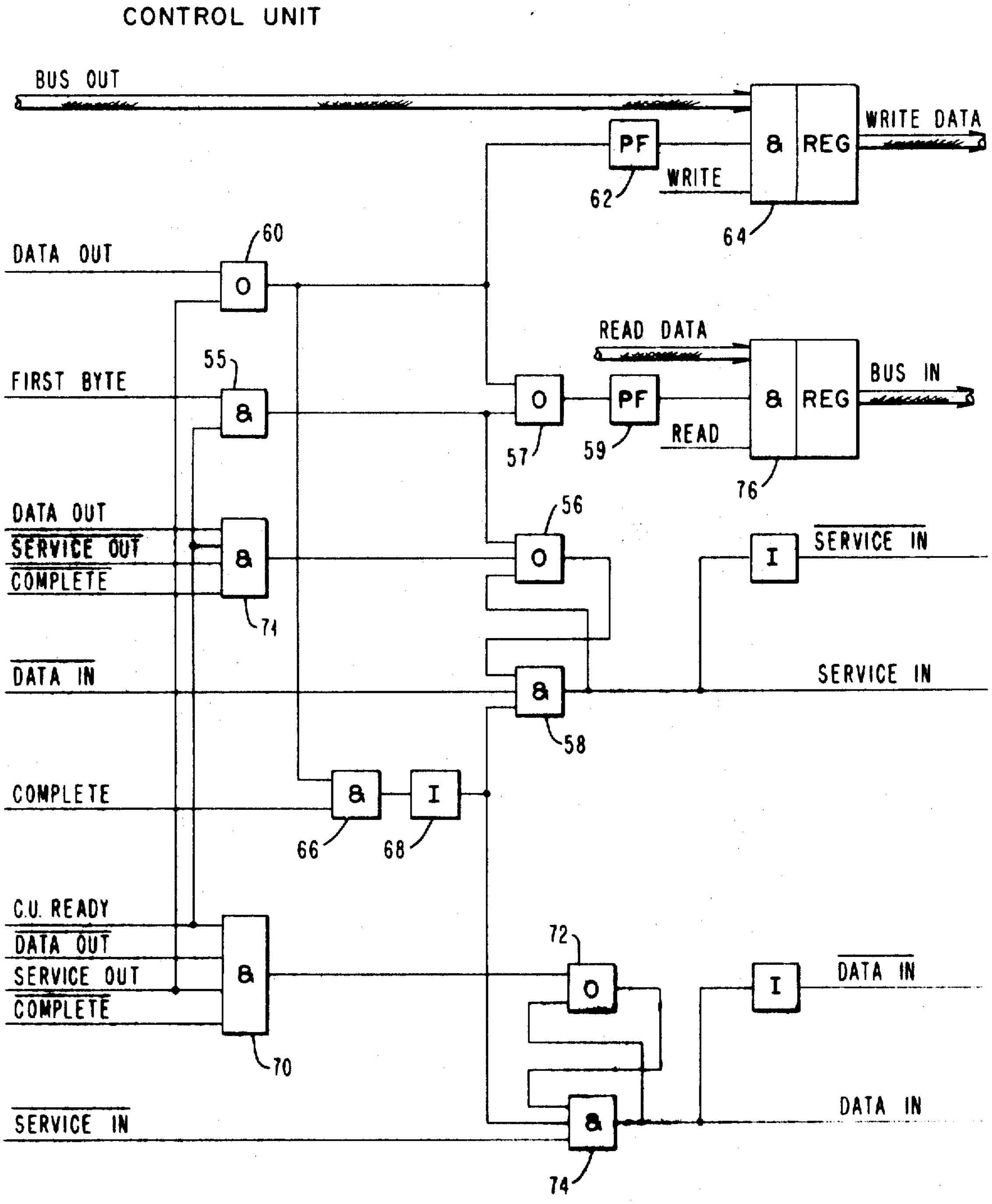

FIGS. 3 and 4 show in more detail typical circuitry for utilizing the data in and data out tag lines in conjunction with the inbound and outbound tags for the appropriate information transfer. It should be understood that the circuitry of FIGS. 3 and 4 can be adapted to any of the inbound and outbound tags although it is shown specifically for a data transfer operation utilizing the service in and service out tags. The timing diagram of FIG. 5 should be consulted in conjunction with the following description.

Figure 5:
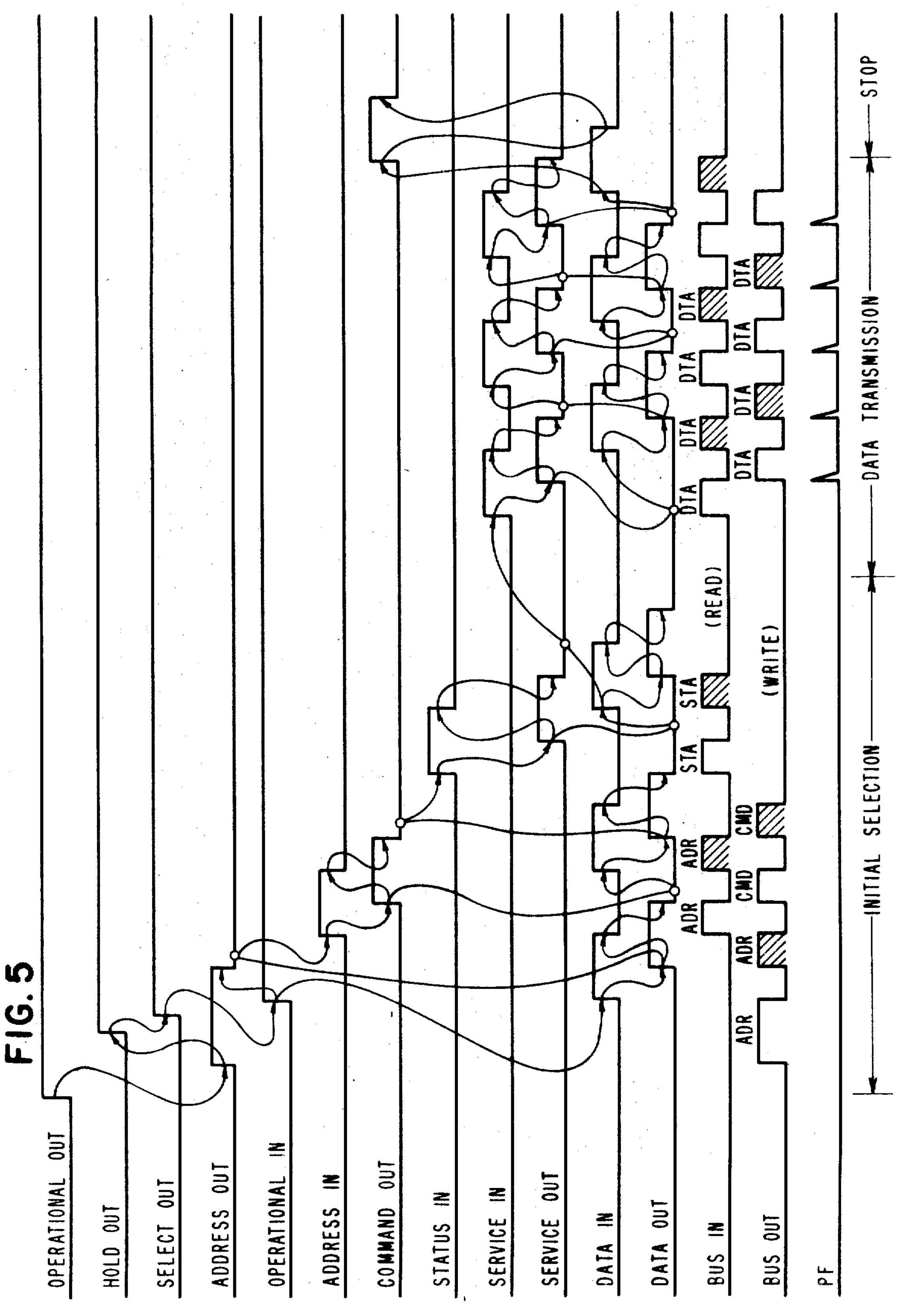
FIG. 5 is a more detailed timing diagram illustrating the operation of the circuits of FIG. 1 and FIGS. 3 and 4.

The transfer of a second address byte, command byte, and status byte during the initial selection sequence (described fully in the above-identified Beausoleil et al. patent) is also illustrated in the timing diagram of FIG. 5.

Initial Selection Sequence

The details of the initial selection sequence are fully set forth in the above identified Beausoleil et al. application and will be summarized with reference to the timing diagram of FIG. 5. To initiate an I/O operation, the channel places the address of the desired input/output device on bus out and raises address out. Each control unit attempts to decode the address but only one control unit will be assigned to that given address. The hold out and select out lines perform a priority selection function which is more fully described in the above identified Beausoleil et al. application. In response to select out, the control unit whose address matches the address on bus out responds by energizing operational in. When operational in rises, the channel responds by dropping address out. A second address (shown shaded on FIG. 5) may be transmitted over bus out following the rise of operational in by utilizing the data in and data out lines. After operational in rises, the data in line is raised. In response to the data in line, the channel places the second address byte on bus out and raises data out. The control unit, in response to the rise of data out and the fall of address out, energizes address in and places its own address on bus in. The channel checks the address on bus in and responds by raising command out and placing the command for that control unit on bus out. A second address (shown shaded on bus in) is transmitted to the channel from the control unit by raising data in in response to command out. The channel responds to data in by raising data out and places the second command on bus out (shown shaded). The control unit responds to data out by dropping data in and the channel responds to the fall of data in by dropping data out. After data out rises, the control unit places status information on bus in and raises status in, if it is desired to transmit status information.

If the channel accepts the status condition, it responds to status in by raising service out. The rise of service out causes status in to fall. A second status byte (shown shaded in FIG. 5) is transmitted at this point by the control unit raising data in. The channel responds to the rise of data in by energizing data out. The control unit responds to data out by dropping data in and the channel responds to the fall of data in by dropping data out. The initial selection sequence is now complete, and as soon as service out falls, the control unit is free to raise service in, when ready, to ask (write operation) for or to transmit (read operation) the first byte of data.

Write Operation

Referring now to FIG. 3, circuitry for implementing the invention in the first terminal (channel) is illustrated. Similar circuitry is provided in the second terminal (control unit —FIG. 4).

After an initial selection sequence, the selected control unit raises service in. This is accomplished (FIG. 4) by the control unit raising "C.U. Ready" which combined with the first byte line at AND 55 turns on latch 56,58 thus raising the service in line. Since service out and data in are deenergized, an output occurs from AND circuit 30 (FIG. 3) which through OR circuit 32 causes the "gate data to bus out" line to be energized. This causes write data to be placed on bus out through AND 41, FIG. 3. A one hundred nanosecond delay 34 is provided to allow time for skew on bus out. The "ready for new data transfer line" 35 provides control by the channel over data transfer and is energized during the write or read operation. At the end of the delay, an output from the delay circuit 34 energizes AND circuit 36 which causes a pulse to be generated from the pulse former (PF) 38. During a write (without read) operation the write only line 37 is energized. Therefore, an output occurs from the AND circuit 40. This output turns on the latch combination OR 42 and AND 44 thus raising the service out line. The service out line will now remain energized until the service in line (input to AND circuit 44) is deenergized.

Referring to FIG. 4, the control unit monitors the service out line. When the service out line is energized, OR 60 is energized and pulse former 62 samples the data on bus out via AND 64. The control unit responds to service out by raising data in, through AND gate 70. Data in rising causes service in to drop. When service in drops, the AND circuit 44 (FIG. 3) is no longer energized and therefore, service out drops. This completes the transfer of the first byte of data.

An overlapped control operation for the transfer of a second byte is accomplished by utilizing the additional control lines data in, data out. After the control unit has dropped service in, the channel no longer has to maintain bus out valid and can place a new byte of data on bus out. Since the control unit is ready, an output from AND 70 (FIG. 4) occurs as soon as service out is energized. This turned on latch 72,74 which raise data in to the channel and caused service in to drop. Referring to FIG. 3, when data in is positive and service in is negative, AND circuit 46 is energized which causes an output from OR circuit 32. OR circuit 32 causes the "gate data to bus out line" to be energized thereby transferring the next byte of information to bus out. After the 100 nanoseconds delay 34, AND circuit 36 is energized causing a pulse from the pulse former 38. Since this is a write only operation, an output from AND circuit 40 occurs which turns on the latch combination 48, 50. This raises data out to the control unit. Data out signals to the control unit that a byte of data is available on bus out. OR circuit 60, FIG. 4, is energized and an output from pulse former 62 samples bus out. The control unit responds to the rise of data out by raising service in which causes data in to drop. When data in drops, the latch 48, 50 (FIG. 3) is unlatched and the data out line falls.

Read Operation

A read operation is similar to a write operation except that read data is transferred from the control unit to the channel upon the rise of service in or data in. Referring now to FIG. 4, after an initial selection sequence the control unit raises "control unit ready." This and the first byte line cause an output from AND circuit 55, OR 57, and pulse former 59 which gates the read data to bus in via AND circuit 76. The output of AND 55 turns on a latch combination 56, 58 which raises service in. Referring to FIG. 3, the channel responds to service in through AND circuit 30 and OR circuit 32 after a 100 nanosecond delay (to take care of skew) 34 to gate the data on bus in to the channel via AND circuit 47. After a brief delay 39, the latch 42, 44 is turned on bringing up the service out line. The control unit responds to service out through AND 70 the output of which turns on latch 72,74 thus turning on data in. Service out through AND 60 also gates read data to bus in. The rise of data in causes latch 56,68 to drop service in. Upon the fall of service in, the next data byte on bus in is valid. In the channel, the service out line output of latch 42 —44 drops because service in drops.

The channel responds to data in through AND circuit 46 and OR circuit 32. After a one hundred nanosecond delay 34, the output of pulse former 38 causes bus in to be sampled by the AND circuit 47. After a delay 39, the latch 48, 50 is turned on causing data out to rise. The control unit responds to data out through AND 71 to turn on latch 56,58 thus raising service in. Service in rising causes the latch 72,74 to be deenergized thus dropping data in. Thus, the transfer of data from a source within the control unit to bus in is synchronized with the energization of service in and data in.

It will be understood from the foregoing description of the various embodiments and modifications, that additional modifications and changes in form and details may be made without departing from the spirit and the scope of the invention as claimed.

What we claim is:

1. In a demand-response interface in which one terminal is capable of demanding data from another terminal by energizing a first demand line connecting the two terminals and in which a first byte of data is transferred to the one terminal by the other terminal in synchronization with the energization of a first response line connecting the two terminals and energizable by said other terminal and wherein receipt of the data is signalled by said one terminal by deenergizing said first demand line, the improvement wherein a second byte of data is transferred comprising:

first means responsive to the deenergization of said first demand line for interpreting said deenergization as a request for a second byte of data; and second means responsive to said first means for synchronizing the transfer of said second byte of data upon the deenergization of said first demand line.

2. The combination according to claim 1 wherein said first means includes means for energizing a second demand line energizable following the deenergization of said first demand line for demanding the transfer of a second byte of data from the other terminal and wherein said second means includes means for energizing a second response line responsive to a signal on said first demand line for synchronizing the transfer of said second byte of data.

3. The combination according to claim 1 wherein said first byte of data is transferred from said one terminal to said other terminal by making said first byte of data available to said other terminal concurrently with the energization of said first demand line, and second second byte of data is made available to said other terminal concurrently with the deenergization of said first demand line.

4. The combination according to claim 1 wherein a first byte of data is transferred from said other terminal to said one terminal by making said data available to said one terminal concurrently with the energization of said first response line, and a second byte of data is made available to said one terminal concurrently with the deenergization of said first response line.

5. The combination according to claim 2 wherein said first byte of data is transferred from said one terminal to said other terminal by making said first byte of data available to said other terminal concurrently with the energization of said first demand line, and said second byte of data is made available to said other terminal concurrently with the energization of said second demand line.

6. The combination according to claim 2 wherein a first byte of data is transferred from said other terminal to said one terminal by making said data available to said one terminal concurrently with the energization of said first response line, and a second byte of data is made available to said one terminal concurrently with the energization of said second response line.

7. For use with a demand-response interface in which one terminal is capable of demanding data from another terminal by energizing a first demand line connecting the two terminals and in which data is transferred to the one terminal by the other terminal in synchronization with a signal on a first response line connecting the two terminals and energizable by said other terminal and wherein receipt of the data is signalled by said one terminal by deenergizing said first demand line, the improvement wherein a second pair of demand and response lines are utilized overlapping the operation of said first pair of demand-response lines for further data transfer comprising, in said one terminal:

means for energizing a second demand line energizable following the deenergization of said first demand line for demanding the transfer of further data from the other terminal and means for energizing a second response line responsive to said second demand line for synchronizing the transfer of said further data.

8. The combination according to claim 7 wherein a first byte of data is transferred from said one terminal to said other terminal by making said first byte of data available to said other terminal concurrently with the energization of said first demand line, and a second byte of data is made available to said other terminal concurrently with the energization of said second demand line.

9. The combination according to claim 7 wherein a first byte of data is transferred from said other terminal to said one terminal by making said data available to said one terminal concurrently with the energization of said first response line, and a second byte of data is made available to said one terminal concurrently with the energization of said second response line.

10. In a communication system including a first terminal and a second terminal, bus out means for transmitting data from said first terminal to said second terminal, bus in means for transmitting data from said second terminal to said first terminal;

means for energizing an outbound tag for indicating that data has been placed on said bus out means by said first terminal;

means for energizing an inbound tag for indicating that data has been placed on said bus in by said second terminal;

said outbound tag energizing means being further responsive to energization of said inbound tag for indicating that data has been received by said first terminal over said bus in;

said inbound tag energizing means being further responsive to energization of said outbound tag for indicating that data has been received by said second terminal over said bus out;

the improvement comprising:

additional outbound tag means for energizing an additional outbound tag for indicating that additional data has been placed on said bus out means by said first terminal; and additional inbound tag means for energizing an inbound tag for indicating that additional data has been placed on said bus in by said second terminal.

11. The combination of claim 10 wherein said additional outbound tag energizing means is responsive to energization of said additional inbound tag for indicating that said additional data has been received by said first terminal over said bus in; and said additional inbound tag energizing means is responsive to energization of said additional outbound tag for indicating that said additional data has been received by said second terminal over said bus out.

12. In a communication system in which a demand-response interface between a first and second terminal controls the transfer of control and data information over a data bus by means of at least a first tag for indicating to said first terminal that information of a first manifestation has been placed on the bus by said second terminal, and a second tag energizable by the first terminal for indicating to the second terminal that said information of a first manifestation has been received by said first terminal, means for transferring information of a second manifestation comprising:

third tag energizing means energizable by said second terminal for indicating that said information of a second manifestation has been placed on said bus by said second terminal, said third tag energizable upon the condition that said second tag has been energized by said first terminal to thereby assure that said information of a first manifestation has been received by said first terminal before said information of a second manifestation is transmitted thereto; and fourth tag energizing means energizable by said first terminal for indicating that said information of a second manifestation has been received by said first terminal.

13. The combination according to claim 7 wherein said one terminal is an input/output control unit.

14. The combination according to claim 8 wherein said one terminal is an input/output control unit.

15. The combination according to claim 9 wherein said one terminal is an input/output control unit.

UNITED STATES PATENT OFFICE
CERTIFICATE OF CORRECTION

Patent No. 3,582,906 Dated June 1, 1971

Inventor(s) William F. Beausoleil et al.

It is certified that error appears in the above-identified patent and that said Letters Patent are hereby corrected as shown below:

Column 1, line 62, "to" should read -- on --. Column 5, line 51, "and second second" should read -- and said second Signed and sealed this 9th day of November 1971.

(SEAL)
Attest:

EDWARD M.FLETCHER,JR.
Attesting Officer

ROBERT GOTTSCHALK
Acting Commissioner of Patents

RM PO-1050 (10-69)

USCOMM-DC 60376-P69
U.S. GOVERNMENT PRINTING OFFICE 1969 O—366-334